United States Patent
Chiang et al.

(10) Patent No.: US 6,782,183 B2
(45) Date of Patent: Aug. 24, 2004

(54) METHOD AND APPARATUS FOR FIBER ARRAY MODULE

(75) Inventors: Chung-I Chiang, Taoyuan (TW); Ming-Jen Wang, Tucheng (TW); Kun-Hsien Cheng, Jungli (TW); Hong-Jueng King, Taoyuan (TW); Huei-Pin Huang, Taoyuan (TW); Chwei-Jing Yeh, Sanchung (TW)

(73) Assignee: Alliance Fiber Optics Products, Sunnyvale, CA (US)

( * ) Notice: Subject to any disclaimer, the term of this patent is extended or adjusted under 35 U.S.C. 154(b) by 0 days.

(21) Appl. No.: 10/418,205

(22) Filed: Apr. 18, 2003

(65) Prior Publication Data
US 2003/0198454 A1 Oct. 23, 2003

(30) Foreign Application Priority Data
Apr. 19, 2002 (TW) ........................... 91108153 A

(51) Int. Cl.⁷ ................................................. G02B 6/00
(52) U.S. Cl. ........................................ 385/137; 385/147
(58) Field of Search ............................ 385/137, 147, 385/58, 89

(56) References Cited

U.S. PATENT DOCUMENTS

| | | | | |
|---|---|---|---|---|
| 5,205,032 A | * | 4/1993 | Kuroda et al. ........ | 29/740 |
| 6,215,944 B1 | * | 4/2001 | Ota et al. ........ | 385/137 |
| 6,628,854 B1 | * | 9/2003 | Koh et al. ........ | 385/14 |
| 2003/0011055 A1 | * | 1/2003 | Nakajima ........ | 257/678 |
| 2003/0072538 A1 | * | 4/2003 | Jin et al. ........ | 385/89 |

\* cited by examiner

Primary Examiner—Chandrika Prasad
(74) Attorney, Agent, or Firm—Bacon & Thomas, PLLC

(57) ABSTRACT

A fiber array module fabrication method. The method includes the steps of: (a) preparing a optical fiber ribbon, a solder/binder coated fiber array substrate, and two holder bases, one holder base having longitudinally extended locating grooves; (b) putting the fiber array substrate in between the holder bases and keeping the longitudinally extended grooves of the fiber array substrate in alignment with the longitudinally extended aligning grooves of the holder base and then loading the optical fiber ribbon in the holder bases and keeping the optical fibers of the fiber ribbon in the locating grooves of the holder base and the fixing grooves of the fiber array substrate; (c) heating the solder or radiating the binder to fixedly secure the optical fibers to the fiber array substrate and the fiber array cover plate, and (d) cutting off the optical fibers and removing the finished fiber array module from the holder bases.

15 Claims, 1 Drawing Sheet

METHOD AND APPARATUS FOR FIBER ARRAY MODULE

BACKGROUND OF THE INVENTION

1. Field of the Invention

The present invention relates to a method for fabricating a fiber array module and, more particularly, to an efficient method for fabricating a fiber array module, which is practical for making fiber array modules rapidly.

2. Description of Related Art

In recent years, optical fibers are intensively used as signal transmission media in optical communication. By matching with the development of high-channel-counts-plane-wave-guides and that of dense-wavelength-DeMux/Mutiplexer-DWDM, the communication through optical fibers can meet the demand for transmitting high-volume-data in high speed in internet communication and broadband communication. In most cases, plane-wave-guides of high channel counts containing at least a fiber array are commonly used or sandwiched between related photoelectric components for transmitting signals between those photoelectric components. A conventional fiber array module generally comprises a fiber array substrate having a plurality of V-grooves for receiving and holding optical fibers and keeping loaded optical fibers in accurate aligned positions. Due to thin thickness, it is difficult to mount and to align optical fibers into the V-grooves of the fiber array substrate. Although various measures are developed and adapted for aligning and mounting optical fibers on the V-grooves of a fiber array substrate, the most commonly employed measure is to load the optical fibers on the V-grooves manually. However, this manual loading method is inaccurate, time-consuming and expensive because more employers and much time are required to load optical fibers in the V-grooves of a fiber array substrate.

Therefore, it is desirable to provide a fiber array module fabrication method and apparatus that eliminates the aforesaid drawback.

SUMMARY OF THE INVENTION

It is the main object of the present invention to provide a method for fabricating a fiber array module to simplify the assembling steps, to locating or positioning the optical fibers on said base block accurately, repeatedly and efficiently, and to save the time for assembling.

It is another object of the present invention to provide a fiber array module fabrication apparatus, which enables simplify the assembling steps, to locating or positioning the optical fibers on said base block accurately, repeatedly and efficiently, and to save the time for assembling optical fiber array substrate To achieve these and other objects of the present invention, the method for fabricating a fiber array module comprises the steps of: providing at least one optical fiber ribbon, at least one fiber array substrate having a plurality of fixing grooves, and a device having at least two holder bases with at least one locating groove and aligning grooves, wherein at least one longitudinally extended fixing groove of said fiber array substrate is coated with solders or binders for locating said optical fibers, said locating groove of said holder bases is functioned for locating said optical fiber ribbon, and said aligning grooves is functioned for aligning said optical fibers extended from said ribbon; putting at least one fiber ribbon in said locating groove of said two holder bases, putting said at least one fiber array substrate in between said holder bases, keeping optical fibers of said optical fiber ribbon in the aligning grooves of said holder bases and the fixing grooves of said fiber array substrate; curing said binders or melting said solders through radiation or heat to fasten said optical fibers on said fiber array substrate; and cutting off said optical fibers from said fiber array substrate and then removing fiber array substrate with the secured optical fibers from said two holder bases.

According to one embodiment of the present invention, the apparatus for fabricating a fiber array module by combining at least one optical fiber ribbon, a fiber array substrate, and a fiber array cover plate, wherein the surface of said optical fibers of said optical fiber ribbon or the surface of said fiber array substrate is coated with a layer of binders or solders, comprises: at least two holder bases having locating grooves and a plurality of longitudinally extended locating grooves, wherein said locating grooves are adapted for holding said optical fiber ribbon and for sandwiching said fiber array substrate therebetween, said locating grooves are adapted for aligning said optical fibers extended from said optical fiber ribbon with respective grooves of said fiber array substrate; and a heater or a light adapted to cure said binders or to melt said solders to fix said optical fibers of said optical fiber ribbon to said fiber array substrate and said fiber array cover plate.

According to another embodiment of the present invention, the apparatus for fabricating a fiber array module by combining at least one optical fiber ribbon, a fiber array substrate, and a fiber array cover plate, wherein the surface of said optical fibers of said optical fiber ribbon or the surface of said fiber array substrate is coated with a layer of binders or solders, comprises: at least two holder bases having locating grooves and a plurality of longitudinally extended aligning grooves, wherein said locating grooves are adapted for holding said optical fiber ribbon and for sandwiching said fiber array substrate therebetween, said aligning grooves are adapted for aligning said optical fibers extended from said optical fiber ribbon with respective fixing grooves of said fiber array substrate; and a heater or a light adapted for curing said binders or to melting said solders to fix or to fasten said optical fibers of said optical fiber ribbon to said fiber array substrate and said fiber array cover plate.

Other objects, advantages, and novel features of the invention will become more apparent from the following detailed description when taken in conjunction with the accompanying drawings.

DETAILED DESCRIPTION OF THE PREFERRED EMBODIMENT

The fiber array cover plate to be used for making a fiber array module may be variously embodied. Preferably, the fiber array cover plates are plates having grooves corresponding to the grooves of the fiber array substrate. During step (B) of the fiber array module fabrication method, the fiber array substrate is put in between the two holder bases, keeping the grooves of the fiber array substrate respectively aimed at or connected to the locating grooves of one holder base, and then the optical fibers of the optical fiber ribbon are respectively arranged in the grooves of the fiber array substrate and the locating grooves of the holder base. Preferably, the optical fibers are peripherally coated with a layer of solder or binder. When solder is used, it is preferred to be Sn/Au or Sn/Pb. The selected solder can be coated on the surface of the optical fibers, the fiber array substrate and the corresponding fiber array cover plate. The solder is coated on the optical fibers after stripping of the polymer layer of the optical fibers.

Figure 1:
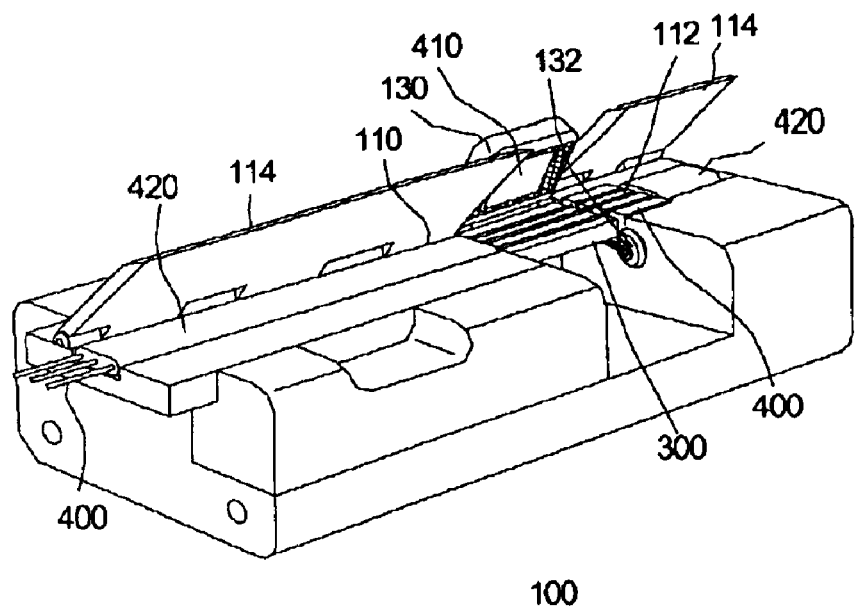
FIG. 1 is a schematic drawing showing a fiber array module fabrication apparatus according to the first embodiment of the present invention.

With reference to FIG. 1, a fiber array module fabrication apparatus 100 in accordance with the first embodiment of the present invention is shown comprising a first holder base 110 having a locating groove, a second holder base 112 having multiple aligning grooves, and a heat source 130. The holder bases 110 and 112 are adapted to hold a fiber array substrate 300, for enabling optical fibers 400 to be put in or aimed at grooves in the fiber array substrate 300. A pivoted cover 114 is respectively provided at the topside of the first holder base 110 and the topside of the second holder base 112. After positioning of a optical fiber ribbon 420 in the locating groove of the first holder base 110 and arranging of the optical fibers 400 of the optical fiber ribbon 420 in the aligning grooves of the second holder base 112, the pivoted covers 114 are closed on the holder bases 110 and 112 to hold the optical fiber ribbon 420 in the fiber array substrate 300. A space is defined between the holder bases 110 and 112 for receiving the fiber array substrate 300. The heat source 130 provides heat or radiation to melt the applied solders or polymerize the applied binders on the surface of the optical fibers or the surface of the fiber array substrate, thereby causing applied solders or binders to fixedly secure the optical fibers 400 to the,fiber array substrate 300 and the corresponding fiber array cover plate. A cutter assembly 32 is pivoted to the second holder base 112 in the space between the holder bases 110 and 112, and adapted to cut off optical fibers 400 at the ends of the grooves of the fiber array substrate 300 adjacent the second holder base 112, separating the optical fibers 400 at the fiber array substrate 300 from the second holder base 112. According to this embodiment, the grooves in the second holder base 112 are preferably V-grooves arranged in parallel.

The fiber array module fabrication method using the fiber array module fabrication apparatus 100 according to the first embodiment of the present invention is outlined hereinafter. At first, the prepared fiber array substrate 300 is put between the holder bases 110 and 112, keeping the fixing grooves of the fiber array substrate 300 in alignment with the aligning grooves of the second holder base 112, and then optical fibers 400 are arranged in the aligning grooves of the second holder base 112 and the fixing grooves of the fiber array substrate 300. Before installation of the optical fibers 400, the surface of the fiber array substrate 300 (including the fixing grooves of the fiber array substrate 300) is coated with a layer of solders or binders. Preferably, the optical fibers 400 are peripherally coated with a layer of solders or binders. After alignment of the fixing grooves of the fiber array substrate 300 with the aligning grooves of the second holder base 112, the prepared optical fibers 400 are put in the fixing grooves of the fiber array substrate 300 and the aligning grooves of the second holder base 112. Because the fixing grooves of the fiber array substrate 300 are respectively aligned with the aligning grooves of the second holder base 112, the optical fibers 400 can be easily and accurately positioned in the grooves of the fiber array substrate 300. After positioning of the optical fibers 400 in the grooves of the fiber array substrate 300 and the aligning grooves of the second holder base 112, the fiber array cover plate 410 is closed on the fiber array substrate 300 over the optical fibers 400 in the fiber array substrate 300, and the pivoted covers 114 are closed to bold down the optical fiber ribbon 420 in the aligning groove of the first holder base 110 and the optical fibers 400 of the optical fiber ribbon 420 in the aligning grooves of the second holder base 112, and then the heat source 130 is started to heat or radiate the optical fibers 400, thereby causing the solder or binder to fixedly secure the optical fibers 400 to the fiber array substrate 300 and the fiber array cover plate 410. At final, the cutter assembly 132 is operated to cut off the optical fibers along the vertical inner sidewall of the second holder base 112, and then the assembly of the fiber array substrate 300, the optical fiber ribbon 420 and the fiber array cover plate 410, i.e., the finished fiber array module is removed from the fiber array module fabrication apparatus 100.

Figure 2:
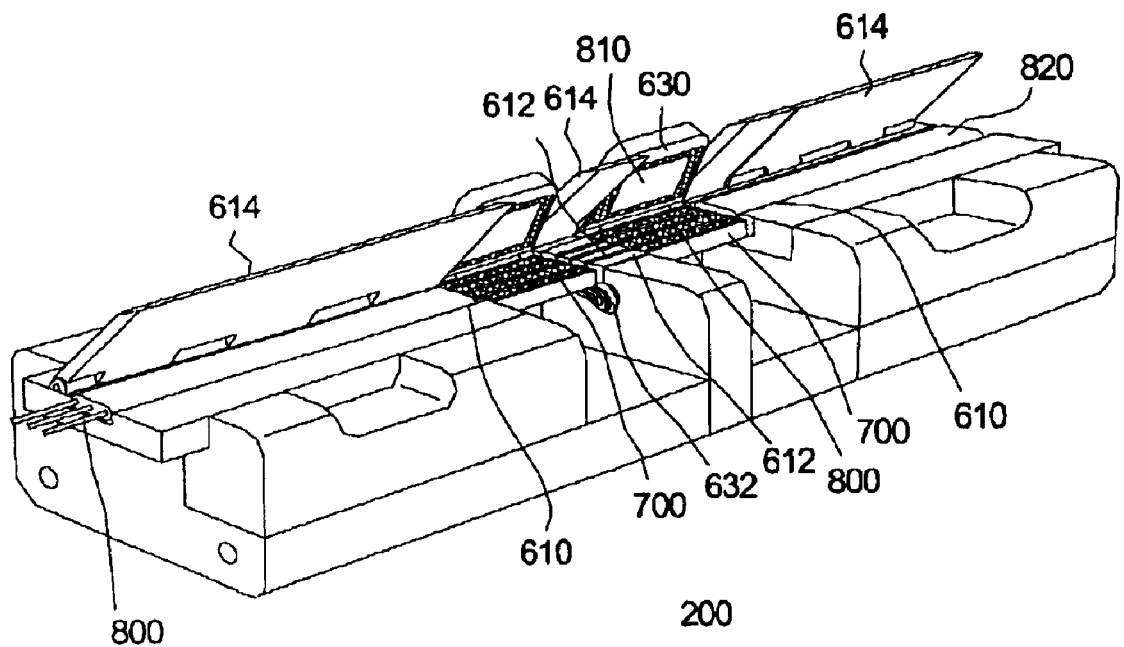
FIG. 2 is a schematic drawing showing a fiber array module fabrication apparatus according to the second embodiment of the present invention.

FIG. 2 shows a fiber array module fabrication apparatus according to the second embodiment of the present invention. According to this embodiment, the fiber array module fabrication apparatus 200 comprises two first holder bases 610 each having a longitudinally extended locating groove, a second holder base 612 having a plurality of longitudinally extended aligning grooves, the second holder base 612 being spaced between the first holder bases 610, two cutter assemblies 632 respectively pivoted to two opposite vertical lateral sides of the second holder base 612, and two heat sources 630 respectively arranged between the first holder bases 610 and the second holder base 612.

The holder bases 610 and 612 are adapted to hold two fiber array substrates 700, keeping the fixing grooves of the fiber array substrates 700 respectively aimed at or connected to the aligning grooves of the second holder base 612, so that optical fibers 400 of optical fiber ribbon s 820 can easily and accurately be put in the fixing grooves of the fiber array substrates 700. Two covers 614 are respectively pivoted to the first holder bases 610 and adapted to hold down the optical fiber ribbon s 820. After positioning of optical fiber ribbons 820 in the locating grooves of the first holder bases 610 and arranging of the optical fibers 800 of the optical fiber ribbons 820 in the aligning grooves of the second holder base 612, the pivoted covers 614 are closed on the first holder bases 610 to hold down the optical fiber ribbons 820 in the fiber array substrates 700. Two spaces are respectively defined between the first holder bases 610 and the second holder base 612 for receiving the fiber array substrates 700. The heat sources 130 provide heat or radiation to melt applied solder or polymerize applied binder, thereby causing applied solder or binders to fixedly secure the optical fibers 800 to the fiber array substrates 700 and the corresponding fiber array cover plates. The cutter assemblies 632 are respectively pivoted to the second holder base 612 in the spaces between the first holder bases 610 and second holder base 612, and adapted to cut off optical fibers 700 at the ends of the grooves of the fiber array substrates 700 adjacent the second holder base 612, separating the optical fibers 700 at the fiber array substrates 700 from the second holder base 612. According to this embodiment, the grooves in the second holder base 612 are preferably V-grooves arranged in parallel.

The fiber array module fabrication method using the fiber array module fabrication apparatus 200 according to the second embodiment of the present invention is outlined hereinafter. At first, the prepared two fiber array substrates 700 are respectively put in between the first holder bases 610 and the second holder base 612, keeping the fixing grooves of the fiber array substrates 700 in alignment with the aligning grooves of the second holder base 612, and then optical fibers 400 are arranged in the locating grooves of the second holder base 612 and the grooves of the fiber array substrates 700. Before installation of the optical fibers 700, the surface of each fiber array substrate 700 (including the grooves of each fiber array substrate 700) is respectively coated with a layer of solders or binders. Preferably, the optical fibers 700 are peripherally coated with a layer of solders or binders. After alignment of the grooves of the fiber array substrates 700 with the aligning grooves of the second holder base 612, the prepared optical fibers 800 are put in the fixing grooves of the fiber array substrates 700 and the aligning grooves of the second holder base 612. Because the fixing grooves of the fiber array substrates 700 are respectively aligned with the aligning grooves of the second holder base 612, the optical fibers 800 can be easily and accurately positioned in the fixing grooves of the fiber array substrates 700. After positioning of the optical fibers 800 in the fixing grooves of the fiber array substrates 700 and the aligning grooves of the second holder base 612, the fiber array cover plates 810 are closed on the fiber array substrates 700 over the optical fibers 800 in the fiber array substrates 700, and the pivoted covers 614 are closed to hold down the optical fiber ribbons 820 in the locating grooves of the first holder base 610 and the optical fibers 800 of the optical fiber ribbon 820 in the aligning grooves of the second holder base 612, and then the heat source 630 are started to heat or radiate the optical fibers 800, thereby causing the solders or binders to fixedly secure the optical fibers 800 to the fiber array substrates 700 and the fiber array cover plates 810. At final, the cutter assemblies 632 are operated to cut off the optical fibers along the two opposite vertical lateral sidewalls of the second holder base 612, and then the two assemblies of the respective fiber array substrates 700, optical fiber ribbon s 820 and fiber array cover plates 810, i.e., the two finished fiber array modules are removed from the fiber array module fabrication apparatus 200.

Although the present invention has been explained in relation to its preferred embodiments, it is to be understood that many other possible modifications and variations can be made without departing from the spirit and scope of the invention as hereinafter claimed.

What is claimed is:

1. A method for fabricating a fiber array module comprising the steps of:
   (A) providing at least one optical fiber ribbon, at least one fiber array substrate having a plurality of fixing grooves, and a device having at least two holder bases with at least one locating groove and aligning grooves, wherein at least one longitudinally extended fixing groove of said fiber array substrate is coated with solders or binders for locating optical fibers extended from said at least one optical fiber ribbon, said locating groove of said holder bases is configured for locating said optical fiber ribbon, and said aligning grooves are configured for aligning said optical fibers extended from said optical fiber ribbon;
   (B) putting said at least one fiber ribbon in said locating groove of said two holder bases, putting said at least one fiber array substrate in between said holder bases, keeping optical fibers of said optical fiber ribbon in the aligning grooves of said holder bases and the fixing grooves of said fiber array substrate;
   (C) curing said binders or melting said solders through radiation or heat to fasten said optical fibers on said fiber array substrate; and
   (D) cutting off said optical fibers from said fiber array substrate and then removing said fiber array substrate with the secured optical fibers from said two holder bases.

2. The method as claimed in claim 1, further comprising a sub step (C2) providing at least one fiber array cover plate adapted for fastening to said fiber array substrate and further curing said binders or melting said solders through radiation or heat to fix said optical fibers between said fiber array substrate and said fiber array cover plate.

3. The method as claimed in claim 2, wherein a surface of said fiber array cover plate is coated with a layer of said solders or said binders.

4. The method as claimed in claim 1, wherein said step (B) is to put one of said at least one fiber array substrate in between two of said at least two holder bases, keeping the longitudinally extended fixing grooves of the fiber array substrate in alignment with the longitudinally extended ones of said aligning grooves of one of the two holder bases, and then to put said optical fibers of one of said at least one fiber ribbon in the fixing grooves of the fiber array substrate and the locating grooves of the holder base that are aligned with the fixing grooves of the fiber array substrate.

5. The method as claimed in claim 1, wherein an outer surface of said optical fibers are peripherally coated with a layer of said binders or said solders.

6. The method as claimed in claim 1, wherein said solders are Sn/Au or Sn/Pb.

7. The method as claimed in claim 5, wherein said outer surface of said optical fibers are peripherally coated with a layer of said solders or said binders after stripping out an outer polymer layer from said optical fiber ribbon.

8. An apparatus for fabricating a fiber array module by combining at least one optical fiber ribbon, a fiber array substrate, and a fiber array cover plate, wherein an outer surface of said optical fibers of said optical fiber ribbon or a surface of said fiber array substrate is coated with a layer of binders or solders, comprising:
   at least two holder bases having locating grooves, wherein said locating grooves are adapted for holding said optical fiber ribbon and for sandwiching said fiber array substrate therebetween, and for aligning said optical fibers extended from said optical fiber ribbon with respective ones of said fixing grooves of said fiber array substrate; and
   a heater or a light adapted to cure said binders or to melt said solders to fix said optical fibers of said optical fiber ribbon to said fiber array substrate and said fiber array cover plate.

9. The apparatus as claimed in claim 8, further comprising a cutter assembly adapted to cut off the optical fibers of said optical fiber ribbon from one end of said fiber array substrate.

10. The apparatus as claimed in claim 8, wherein the longitudinally extended ones of said locating grooves of said holder bases are arranged in parallel.

11. The apparatus as claimed in claim 8, wherein the locating grooves of said holder bases are V-grooves.

12. An apparatus for fabricating a fiber array module by combining at least one optical fiber ribbon, a fiber array substrate, and a fiber array cover plate, wherein an outer surface of optical fibers of said optical fiber ribbon or a surface of said fiber array substrate is coated with a layer of binders or solders, comprising:
   at least two holder bases having locating grooves and a plurality of longitudinally extended aligning grooves, wherein said locating grooves are adapted for holding said optical fiber ribbon and for sandwiching said fiber array substrate therebetween, said aligning grooves are adapted for aligning said optical fibers extended from said optical fiber ribbon with respective fixing grooves of said fiber array substrate; and a heater or a light adapted for curing said binders or to melting said solders to fix or to fasten said optical fibers of said optical fiber ribbon to said fiber array substrate and said fiber array cover plate.

13. The apparatus as claimed in claim 12, further comprising at least one cutter assembly adapted to cut off the optical fibers of the optical fiber ribbon from one end of each of the fiber array substrates.

14. The apparatus as claimed in claim 12, wherein the longitudinally extended aligning grooves of said holder bases are V-grooves.

15. The fiber array module fabrication apparatus as claimed in claim 12, wherein the longitudinally extended aligning grooves of said holder bases are respectively arranged in parallel.

* * * * *